United States Patent
Fabry

(10) Patent No.: US 9,844,760 B2
(45) Date of Patent: Dec. 19, 2017

(54) AERATION DEVICE, A USE THEREOF, AND WATER PURIFICATION INSTALLATION WITH SUCH AN AERATION DEVICE

(71) Applicant: ATLAS COPCO AIRPOWER, naamloze vennootschap, Wilrijk (BE)

(72) Inventor: Erik Paul Fabry, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 84 days.

(21) Appl. No.: 14/407,285

(22) PCT Filed: Jun. 18, 2013

(86) PCT No.: PCT/BE2013/000031
§ 371 (c)(1),
(2) Date: Dec. 11, 2014

(87) PCT Pub. No.: WO2014/005199
PCT Pub. Date: Jan. 9, 2014

(65) Prior Publication Data
US 2015/0165391 A1    Jun. 18, 2015

(30) Foreign Application Priority Data

Jul. 5, 2012 (BE) .................................. 2012/0463

(51) Int. Cl.
*B01F 3/04* (2006.01)
*C02F 3/20* (2006.01)
(Continued)

(52) U.S. Cl.
CPC ............ *B01F 3/04255* (2013.01); *C02F 1/74* (2013.01); *C02F 3/205* (2013.01);
(Continued)

(58) Field of Classification Search
CPC ........ B01F 13/0049; B01F 2003/04163; B01F 3/042555; B01F 2003/04276; C02F 3/205;
(Continued)

(56) References Cited

U.S. PATENT DOCUMENTS 4,469,596 A * 9/1984 Kantor ...................... C02F 1/72
137/236.1
4,482,510 A * 11/1984 Khudenko .......... B01F 3/04773
210/242.2
(Continued)

FOREIGN PATENT DOCUMENTS

CN        2171598         7/1994
CN        102414452 A     4/2012
(Continued)

OTHER PUBLICATIONS

Translation of DE 44 05 961 published Aug. 31, 1995 as translated by FLS, Inc. on Jul. 2016.*
(Continued)

*Primary Examiner* — Amber R Orlando
*Assistant Examiner* — Stephen Hobson
(74) *Attorney, Agent, or Firm* — Bacon & Thomas, PLLC

(57) ABSTRACT

An aerator for aerating water comprises a distribution system for distributing air below the water surface and a compressor with an air inlet and at least one air outlet. The compressor is configured to be placed below the water surface. The infiltration of water at the air inlet is prevented by an intake pipe with one open end above the water surface and the other open end has a watertight connection to the compressor. The distribution system has a watertight connection to the air outlet and, due to its nature or by at least one valve, can hold back water. The housing is in thermal contact with the water to cool the compressor. The com- (Continued)

pressor is a centrifugal compressor that comprises an impeller that is driven by a shaft that it is mounted on air bearings, magnetic bearings or both.

18 Claims, 4 Drawing Sheets

(51) Int. Cl.
    *C02F 1/74* (2006.01)
    *F16C 17/00* (2006.01)
    *F04D 29/056* (2006.01)
    *F04D 29/057* (2006.01)
    *F04D 29/058* (2006.01)
    *F16C 32/04* (2006.01)

(52) U.S. Cl.
    CPC ............... *B01F 2003/04163* (2013.01); *B01F 2003/04276* (2013.01); *F04D 29/056* (2013.01); *F04D 29/057* (2013.01); *F04D 29/058* (2013.01); *F16C 17/00* (2013.01); *F16C 32/0402* (2013.01); *Y02W 10/15* (2015.05)

(58) Field of Classification Search
    CPC ........ C02F 1/74; F16C 32/0402; F16C 17/00; F04D 29/057; F04D 29/058; F04D 29/056; Y02W 10/15
    See application file for complete search history.

(56) References Cited

U.S. PATENT DOCUMENTS

| | | | | |
|---|---|---|---|---|
| 2003/0175128 | A1* | 9/2003 | Fabry | F04D 27/02 417/243 |
| 2004/0005228 | A1* | 1/2004 | Agrawal | F04D 25/06 417/365 |
| 2005/0098497 | A1* | 5/2005 | Khudenko | B01D 19/0031 210/620 |
| 2010/0111725 | A1* | 5/2010 | Knoop | F04D 29/0513 417/372 |

FOREIGN PATENT DOCUMENTS

| | | | |
|---|---|---|---|
| DE | 4405961 | * | 8/1995 |
| DE | 102008021649 | A1 | 11/2009 |
| EP | 0163821 | A1 | 12/1985 |
| GB | 605046 | * | 7/1948 |
| GB | 1268426 | * | 3/1972 |
| GB | 1268426 | A | 3/1972 |
| JP | S46-43752 | U | 12/1971 |
| JP | S56-38592 | A | 4/1981 |
| JP | S62-49680 | U1 | 3/1987 |
| JP | 2008-111476 | A | 5/2008 |
| KR | 20-1999-0039362 | U | 11/1999 |
| KR | 20-0260504 | U | 1/2002 |
| KR | 10-2002-0078581 | A | 10/2002 |
| KR | 10-0935997 | B1 | 1/2010 |
| KR | 10-2011-0013546 | A | 2/2011 |
| NL | 8600358 | A | 9/1987 |
| WO | 2010/097606 | A1 | 9/2010 |
| WO | 2011/104437 | A1 | 9/2011 |

OTHER PUBLICATIONS

MIT "Heat Transfer From a Fin" published Jan. 16, 2010 accessed at <https://web.archive.org/web/20100116103804/http://web.mit.edu/16.unified/www/FALL/thermodynamics/notes/node128.html>.*
Ingersoll-Rand "Owners Manual" published Feb. 2005.*
Chinese Office Action dated Nov. 25, 2015, for CN 201380035747.4, and English translation thereof.
International Search Report (ISR) dated Sep. 19, 2013, for PCT/BE2013/000031.
Korean Office Action dated Feb. 24, 2017, for KR 10-2015-7003007, and English translation thereof.
Korean Office Action dated Sep. 19, 2017, for KR 10-2015-7003007, and English translation thereof.

* cited by examiner

AERATION DEVICE, A USE THEREOF, AND WATER PURIFICATION INSTALLATION WITH SUCH AN AERATION DEVICE

BACKGROUND OF THE INVENTION

The present invention relates to an aerator.

More specifically, the invention is intended for an aerator that blows air into a distribution system placed under water in order to introduce air into the water.

Such an aerator is primarily used for the aeration of wastewater, so that decomposition processes of impurities work efficiently, but other applications, such as aerating other volumes of water, for example fish farm ponds or swimming pools, are also possible.

Traditionally wastewater basins are aerated by means of a compressor which, by means of a pipe network with valves, provides air to one or more air distribution systems equipped with diffusers placed on or close to the bottom of the basins.

These diffusers are designed to make very small air bubbles, whereby these devices have a very high aeration efficiency.

This efficiency is also known as the Standard Aeration Efficiency (SAE). This is the ratio between the quantity of oxygen introduced in the water and the required quantity of energy to introduce this oxygen in the water.

A disadvantage of such an aerator is that the compressor makes noise and must be cooled. Arrangements must be made for this.

An extensive pipe network, with many couplings, branches and valves, and consequently a high pressure drop, has to be constructed and maintained, because different places in basins have different aeration requirements, and aeration only has to be done if there is a need for it in order to prevent inefficiencies.

Furthermore there is a disadvantage that it is not easy to maintain and/or clean the air distribution systems, and thus to prevent blockages, because the basins have to be emptied for this purpose.

Also the mixing of the water in a basin is generally insufficient for optimum operation, such that additional means have to be used to obtain mixing.

Such aerators also have the disadvantage that they are expensive and cannot easily be moved and thus cannot be deployed flexibly, for example in cases where a fixed installation is too expensive, or is only needed now and again.

A number of these disadvantages are prevented by traditional systems that consist of a pump placed under water that pumps wastewater on its pumping side through a narrowing, and due to the underpressure thus occurring sucks in air via an intake pipe extending from the narrowings to above the water surface. The air sucked in is then pumped together with the pumped water under the water surface from the narrowing, such that the water in the basin is aerated.

However, such installations have a very low SAE, on the one hand because they have to pump large quantities of water for relatively small quantities of air, and on the other hand because they form relatively large air bubbles.

EP 0 163 821 relates to a device that is provided with a structure that can be placed in a basin as a whole. This device comprises a compressor that is placed below the water surface. It is clear that such a device is heavy and bulky, which makes it difficult to handle or move.

GB 1 268 426 concerns a device for aerating a liquid, and this device is equipped with a blower that rests on the bottom of a watercourse, and this blower is driven by an electric motor equipped with ball bearings. A problem with such a device is that it has to be pulled on to the bank for maintenance of the bearings and that it requires the presence of an oil lubricating circuit, which makes the device heavier to lift.

SUMMARY OF THE INVENTION

The purpose of the present invention is to provide a solution to at least one of the aforementioned and/or other disadvantages by providing an aerator for aerating water that comprises a distribution system for distributing air below the water surface and a compressor with an air inlet and at least one air outlet, whereby the compressor is configured to be placed below the water surface by this compressor being provided with a housing that prevents the infiltration of water into the compressor, whereby the infiltration of water at the air inlet is prevented by an intake pipe being provided of which one open end is above the water surface and the other open end has a watertight connection to the compressor in such a way that the air inlet can suck air out of the atmosphere via the intake pipe, whereby the infiltration of water at the air outlet is prevented because the distribution system has a watertight connection to the air outlet and, due to its nature or by at least one valve, can hold back water and whereby the housing is in thermal contact with the water to cool the compressor, and whereby the compressor is a centrifugal compressor that comprises an impeller that is driven by a shaft that it is mounted on air bearings, magnetic bearings or both.

This has the advantage that such an aerator can bring air under water with a high efficiency, thus a high SAE value, without an extensive network of air pipes with valves and connections.

Moreover, noise generated by such an aerator is damped by the water, and it is not necessary to provide a cooling circuit or fans to cool a compressor.

Such an aerator is also not visible and thus does not spoil the landscape.

The aerator can also be connected or disconnected according to need, in this way to deliver the right quantity of aeration directed at every location when a number of aerators are used.

Other important advantages of an aerator according to the invention are that it is practically maintenance free, for example due to the use of magnetic and/or air bearings, and that it does not need to be equipped with an oil lubricating circuit, whereby the aerator can be made light and easy to handle.

In a preferred embodiment the distribution system comprises at least one diffuser.

In this way a higher SAE can be achieved with little or no energy loss for the distribution of pressurised air, by a diffuser being used that yields small air bubbles with a good oxygen transfer.

Preferably the distribution system comprises at least two distribution arms leading away from the compressor that are each equipped with at least two diffusers, and preferably a distribution arm is also provided with a side branch that is equipped with at least one diffuser.

In this way a good air distribution is obtained over a relatively large surface area.

The shaft of the compressor is preferably provided with a cavity extending along the length of the shaft, and the compressor is provided with an air channel that runs from the pressure side to the intake side via the cavity.

This has the advantage that cooling air or air can flow to and/or from any air bearings via the cavity.

In a further preferred embodiment the compressor and the distribution system are arranged so they can rotate around a vertical axis.

This has the advantage that a larger proportion of a basin can be aerated efficiently, and that the distribution system can act as a mixer for the water in the basin at the same time.

The opposing torque of the rotating shaft ensures a turning motion of the compressor and distribution system. Preferably, in order to exert an additional force for the turning motion, the distribution system is equipped with a nozzle with a direction that has at least a component perpendicular to the radial direction.

As a result no separate drive is needed to cause the turning motion.

In a preferred embodiment the air inlet and/or air outlet of the compressor are positioned under the motor and/or the impeller.

This has the advantage that in the event of a leak in the system, or failure of connections, due to its closed housing, the compressor will enclose internally an air bubble that holds back the water.

As a result the compressor is easily and better protected against water damage.

Hereby in a further preferred embodiment the connections between the compressor and the intake pipe, and between the air outlet and the distribution system, are detachable, whereby a valve in both the intake pipe and the distribution system prevents the infiltration of water.

As a result, with large heavy aerators the compressor can be disconnected from the rest of the aerator and pulled above the water in order to be serviced, repaired and/or replaced.

In a further preferred embodiment the aerator can be lifted out of the water as a whole using a handle that is attached on top of the aerator.

As a result, the aerator, including the air distribution system, can be easily taken in and out of the basin for maintenance or cleaning, without the basin having to be emptied.

It can also be constructed as a small and cheap aerator that is flexibly deployable and easy to clean, and which nevertheless can bring air under water with a high efficiency.

The invention also relates to a water purification plant that comprises at least one basin for water that has to be aerated, whereby a component of the water purification plant is an aerator, as described above.

The invention further relates to the use of an aerator, as described above, to introduce air into the wastewater to be purified.

BRIEF DESCRIPTION OF THE DRAWINGS

With the intention of better showing the characteristics of the invention, a few preferred embodiments of an aerator according to the invention are described hereinafter by way of an example, without any limiting nature, with reference to the accompanying drawings, wherein.

Figure 1:
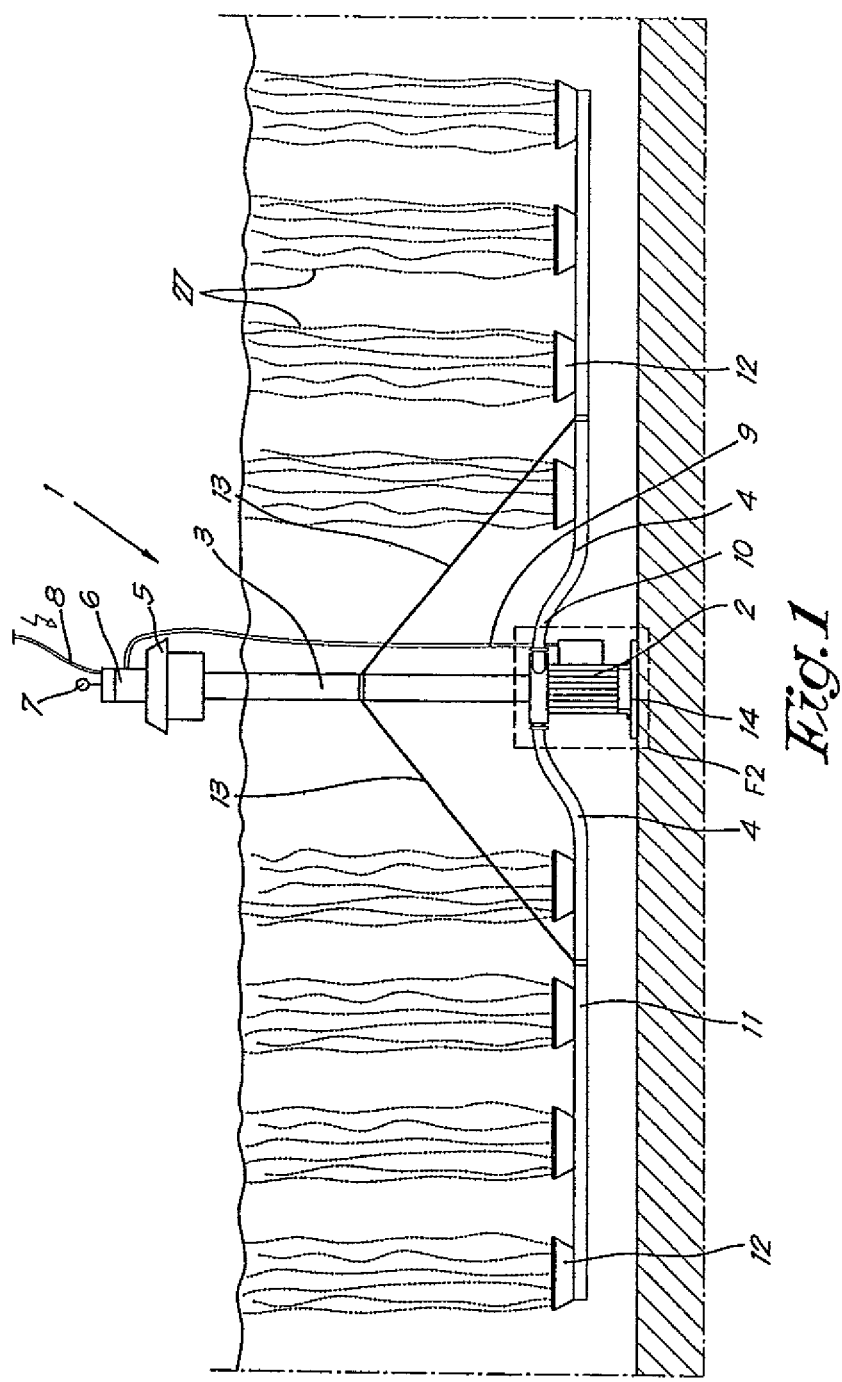
FIG. 1 shows a schematic side view of an aerator according to the invention in operation.
Figure 2:
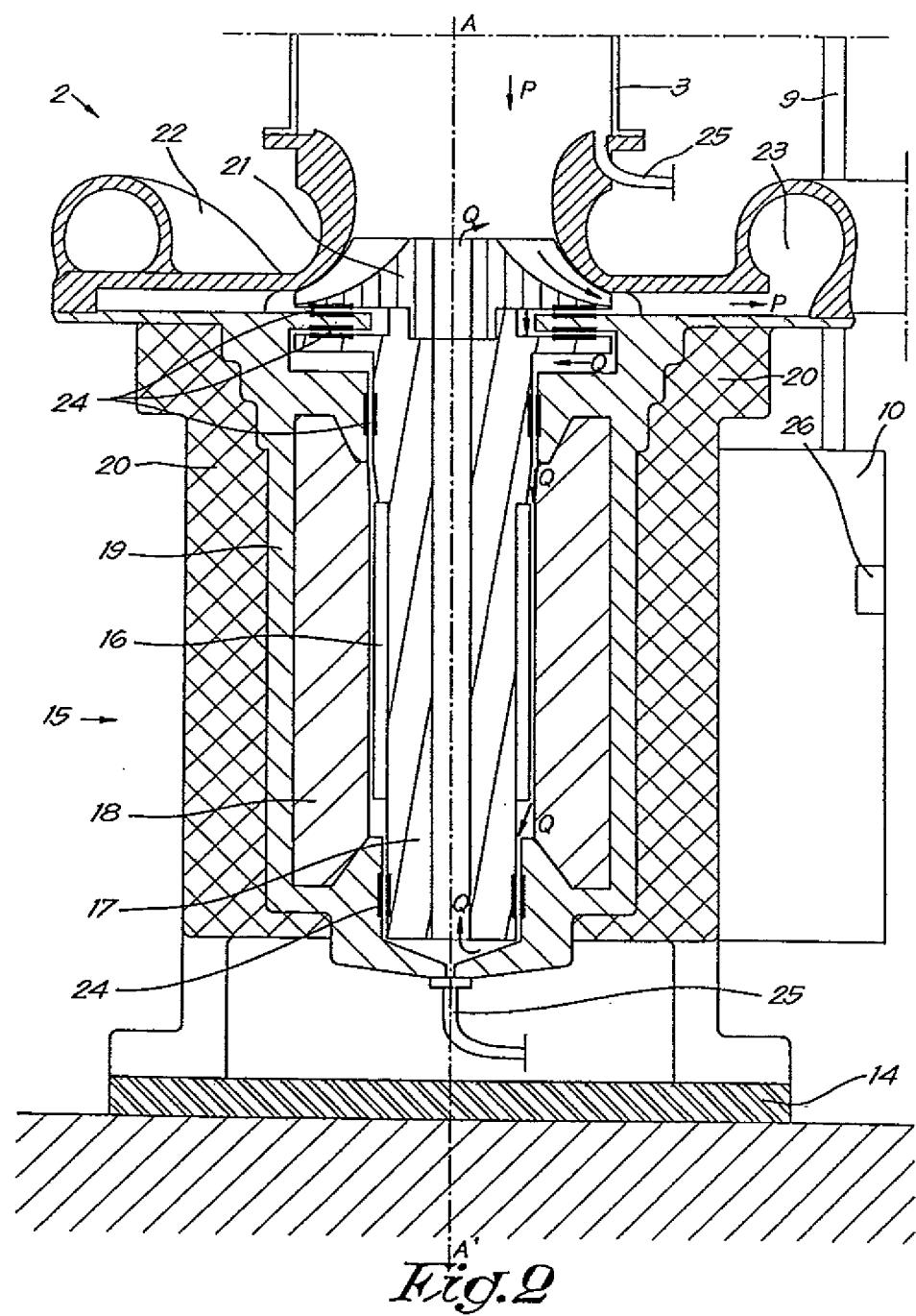
FIG. 2 shows a cross-section of the part of the aerator of FIG. 1 that is indicated by F2.

The aerator 1 shown in FIGS. 1 and 2 essentially consists of a compressor 2 connected to an intake pipe 3 and an air distribution system 4.

DETAILED DESCRIPTION OF THE INVENTION

The intake pipe 3 is provided with a covering 5 to keep out rainwater, a slip ring 6 for electrical connections and a handle, in this case in the form of a lifting eye 7.

An external power supply cable 8 is connected to the slip ring, and a second cable 9 runs from the slip ring to a control unit 10 that is connected to the compressor 2.

The air distribution system consists of two distribution arms 11 connected to the compressor 2 in the radial direction, each with four diffusers 12. The distribution arms are suspended from the intake pipe 4 via a suspension cable 13, and hang freely from the bottom of the basin in which the aerator 1 is placed.

The aerator 1 stands on a turntable 14, that enables the aerator 1 to turn around its axis A-A'. This can be a turntable 14 that is fastened at or on the bottom of the basin so that it is free to turn, but it can also be an actively driven turntable.

As shown in FIG. 2 the compressor is a centrifugal compressor 2 that rests on the turntable 14. The compressor 2 comprises a motor 15 whose rotor 16 is integrated in a hollow central shaft 17, and the stator 18 sits in the motor housing 19. The motor housing 19 is provided with cooling fins 20.

The compressor also comprises a centrifugal impeller 21 that is mounted on the shaft 17, and which is surrounded by a volute 22 on which air outlets 23 are provided.

In this case an air bearing 24 is provided in a number of places between the rotor 16 and the housing 19. According to the invention the number of air bearings 24 can be freely chosen and also, according to an embodiment not shown in the drawings, the shaft 17 can be mounted on bearings by a combination of one or more air bearings with one or more magnetic bearings. However a variant in which the shaft 17 is mounted on one or more magnetic bearings is within the scope of the present invention.

Condensate outlets 25 are provided at the bottom of the housing 19, and near the connection between the intake pipe 3 and the compressor 2.

The motor housing 19 and the volute 22 together form a compressor housing that prevents the infiltration of water into the compressor.

An oxygen sensor 26 is connected to the control unit 10.

The operation of the aerator 1 is very simple and as follows.

The aerator is lifted from the lifting eye 7 by an external lifting apparatus and placed in the desired position on a turntable 14 in a basin with water to be aerated.

Electricity is supplied to the cable 8, and consequently also to the second cable 9, via the slip ring 6.

The oxygen sensor measures the oxygen level in the water. If this is below a threshold, the control unit 10 will start up the motor 15, such that the rotor 16, the shaft 17 and the impeller 21 start to turn.

Air is now sucked in from the atmosphere via the intake pipe 3 and pushed, due to the action of the impeller 21 and the volute 22, under pressure from the air outlets 21 to the distribution arms 11 and thereby the diffusers 12, whereby this air comes out as small bubbles 27 that can transfer their oxygen to the water. This is indicated in FIG. 2 by the arrows P.

A proportion of the pressurised air on the outlet side of the impeller 21 also flows to the air bearings 24, along a path indicated by arrows Q in FIG. 2, and from the air bearings 24 via the hollow shaft 17 again to the intake pipe 3. Because the air bearings 24 are supplied with compressed air, they support the rotating parts 16, 17, 21 of the compressor 2.

As soon as the oxygen concentration measured by the oxygen sensor 26 goes above the threshold, the motor 15 of the compressor is switched off again by the control unit 10.

Because the diffusers 12 can allow air through but not water, while the compressor 2 is stopped no water can infiltrate the compressor 2 via the air distribution system 4.

If the air distribution system 4 has elements that could allow water into the air distribution system 4 when the compressor 2 is stopped, suitable valves, for example non-return valves, must be provided to prevent this water from being able to damage the compressor 2.

The heat generated in the motor 15 during use is conducted to the water via the cooling fins 20 of the motor housing 19, by which the motor 15 is cooled.

During use water vapour in the air can condense in the aerator 1. The condensate formed can be removed via condensate outlets 25.

A turning motion, independent of the driving force for this, of the entire aerator 1 is possible on account of the turntable 14, and on account of the slip ring that can maintain an electrical connection between a fixed power source on the berm and the turning motor.

The cable 8, the second cable 9 and the slip ring 6 can also be used to transmit control signals to the control unit 10.

The oxygen sensor 26 is optional, although without this oxygen sensor 26 the aerator 1 cannot control itself as a function of the oxygen content of the water, but can only be on or off, or it can adjust its operation on the basis of an external control signal.

If the aerator 1 requires maintenance or cleaning, it can easily be taken out of the water as a whole, i.e. with the air distribution system, via the lifting eye.

If various aerators 1 are in a single basin, a specific aerator 1 is only used by the automatic oxygen-dependent controller if necessary locally, such that unnecessary aeration, and thus unnecessary energy consumption, is avoided.

Figure 3:
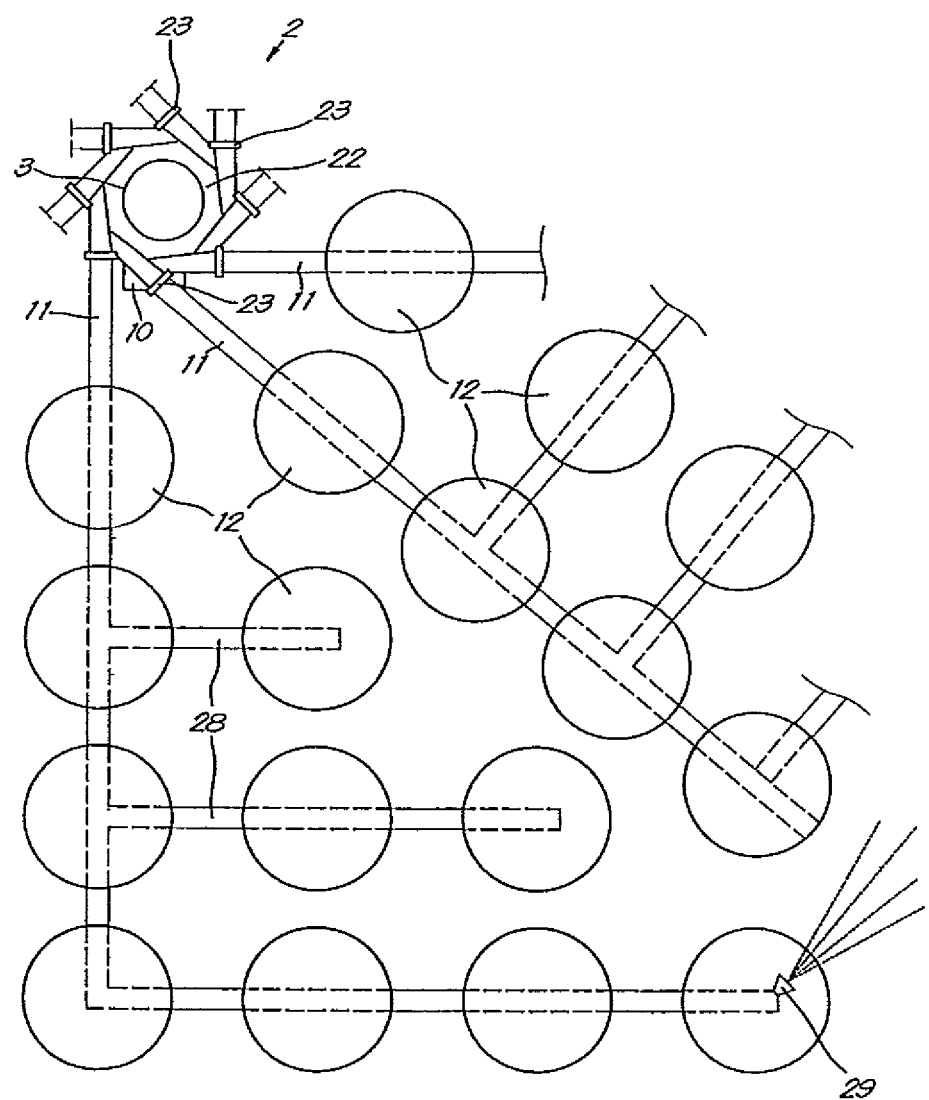
FIG. 3 shows a top view of a part of another embodiment of an aerator according to the invention.

The aerator 1 shown in FIG. 3 differs from the aerator 1 described above by there being eight air outlets 23 and distribution arms 11, whereby each distribution arm 11 is provided with three sidelong branches 28, that are each equipped with diffusers 12, so that for each distribution arm 11, including its sidelong branches 28, ten diffusers 12 are provided.

One of the sidelong branches 28 of each distribution arm 11 is provided with a nozzle 29 that has a direction, i.e. a direction in which it ejects air in operation, that has at least a component that is perpendicular to the radial direction seen from the compressor 2.

The use of this variant of the aerator 1 differs from the use described above in that a larger quantity of water is being aerated. Moreover during the use of this variant of the aerator 1, part of the air pushed into the air distribution system 4 by the compressor is pushed out of the nozzle 29. As a result a force is exerted on the air distribution system in the opposite direction, that makes the entire aerator, except for the lifting eye 7, the cable 8 and a part of the slip ring 6, turn on the turntable.

This turning motion also ensures the mixing of the water around the aerator 1.

Figure 4:
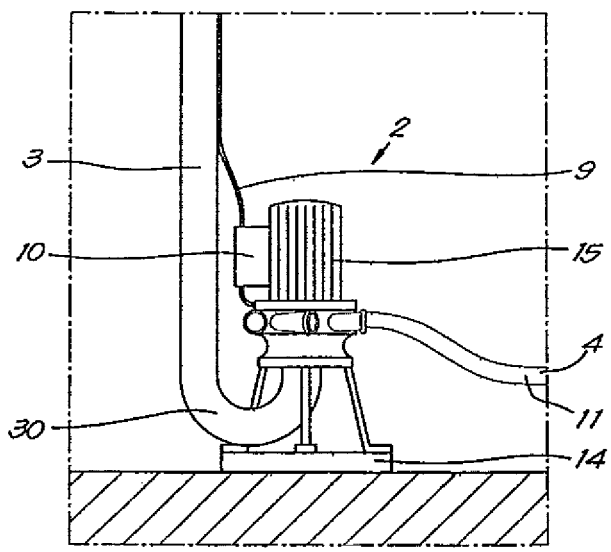
FIGS. 4 and 5 show schematic side views of a part of another two embodiments of an aerator according to the invention.

FIG. 4 shows a part of a variant of the aerator 1 of FIG. 3, whereby the compressor part of the aerator is shown in particular, while only one distribution arm 11 is shown, and the other distribution arms 11 have been omitted for clarity.

This embodiment essentially differs from the embodiments described earlier, by the compressor with its air inlet and air outlet 23 being mounted lower, i.e. the air inlet and air outlet 23 are located below the impeller 21 and motor 15.

In order to make this possible, the intake pipe 3 must follow a curve 30.

The operation of this embodiment is as described above.

The advantage of this embodiment is that in the event of a leak, the compressor 2 is protected against water damage by the air bubble present in the compressor housing.

Figure 5:
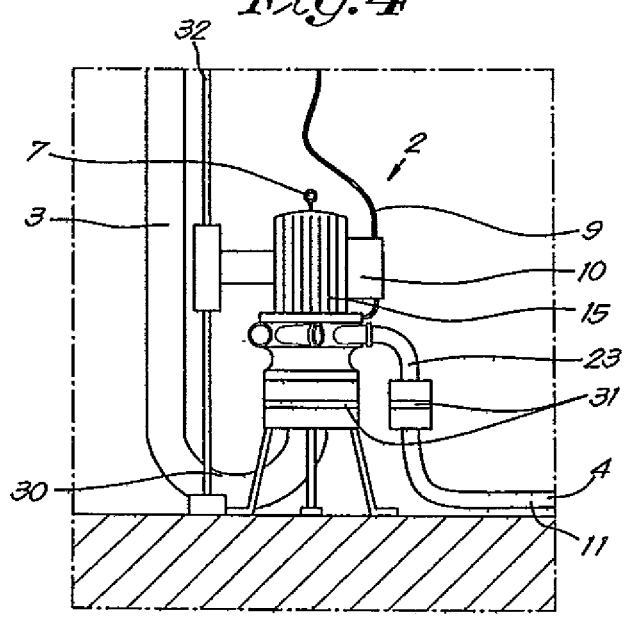

In a similar way to FIG. 4, FIG. 5 describes an alternative embodiment of the aerator 1 according to the invention.

Here the aerator 1 cannot turn, and consequently a slip ring 6 is not necessary. The compressor 2 is detachable, via detachable shutoff devices 31, from the intake pipe 2 and the air distribution system 4, whereby valves in the detachable shutoff devices 31 prevent the intake pipe 2 and the air distribution system 4 from filling up with water.

The compressor 2 can be taken out of the water basin by a lifting device and guided by a guide rail 32 for inspection, maintenance, etc, and then put back again afterwards.

The present invention is by no means limited to the embodiments described as an example and shown in the drawings, but an aerator according to the invention can be realised in all kinds of variants, without departing from the scope of the invention.

The invention claimed is:

1. An aerator for aerating water that comprises a distribution system for distributing air below a water surface and a compressor with an air inlet and at least one air outlet, whereby the compressor is configured to be placed below the water surface in that the compressor is provided with a closed housing configured to prevent an infiltration of the water into the compressor, whereby the infiltration of the water at the air inlet is prevented by an intake pipe being provided of which a first open end is above the water surface and a second open end has a watertight connection to the compressor, whereby the infiltration of the water at the at least one air outlet is prevented by the distribution system having a watertight connection to the at least one air outlet and, due to the watertight connection of the distribution system or by having at least one valve, the housing is closed to hold back the water and whereby the housing is in thermal contact with the water to cool the compressor, wherein the compressor is a centrifugal compressor that comprises an impeller that is driven by a shaft that is mounted on air bearings, wherein a portion of pressurized air from the action of the impeller also flows to the air bearings and then to the intake pipe, and wherein at least one the of the air inlet and/or the air outlet of the compressor is positioned under the motor and/or the impeller such that an air bubble will be enclosed in the compressor to hold back the water in the event of a leak when the compressor is placed below the water surface.

2. The aerator according to claim 1, wherein the distribution system comprises at least one diffuser.

3. The aerator according to claim 2, wherein at least one distribution arm is provided with a sidelong branch that is equipped with at least one diffuser.

4. The aerator according to claim 2, wherein the distribution system comprises at least two distribution arms leading away from the compressor, each distribution arm equipped with at least two diffusers.

5. The aerator according to claim 1, wherein the distribution system comprises at least two distribution arms leading away from the compressor, each distribution arm equipped with at least two diffusers.

6. The aerator according to claim 1, wherein the shaft is provided with a cavity extending in the length of the shaft, and that the compressor is provided with an air channel that runs from a pressure side to the intake pipe via the cavity.

7. The aerator according to claim 1, wherein the compressor and the distribution system are arranged so that the compressor and the distribution system are configured to rotate around a vertical axis.

8. The aerator according to claim 7, wherein the distribution system is equipped with a nozzle with a direction that has at least a component perpendicular to the radial direction.

9. The aerator according to claim 1, wherein the aerator can be taken out of the water as a whole by using a handle that is attached on top of the aerator.

10. The aerator according to claim 9, wherein the distribution system is connected to the compressor in a way that is self-supporting, or wherein support means are provided on the aerator to support the distribution system.

11. The aerator according to claim 1, wherein connections between the compressor and the intake pipe and between the at least one air outlet and the distribution system are detachable, whereby a valve in each of the intake pipe and the distribution system prevents the infiltration of water.

12. The aerator according to claim 1, wherein the housing comprises at least one condensate outlet at a bottom of the housing.

13. The aerator according to claim 1, wherein the housing further comprises cooling fins on the housing.

14. A water purification plant that comprises at least one basin for water that has to be aerated, wherein a component of the water purification plant is an aerator according to claim 1.

15. A use of an aerator according to claim 1 for introducing air into wastewater to be purified.

16. An aerator for aerating water that comprises a distribution system for distributing air below a water surface and a compressor with an air inlet and at least one air outlet, whereby the compressor is configured to be placed below the water surface in that the compressor is provided with a housing configured to prevent an infiltration of the water into the compressor, whereby the infiltration of the water at the air inlet is prevented by an intake pipe being provided of which a first open end is above the water surface and a second open end has a watertight connection to the compressor, whereby the infiltration of the water at the at least one air outlet is prevented by the distribution system having a watertight connection to the at least one air outlet and, due to the watertight connection of the distribution system or by having at least one valve, the housing is closed to hold back the water and whereby the housing is in thermal contact with the water to cool the compressor, wherein the compressor is a centrifugal compressor that comprises an impeller that is driven by a shaft that is mounted on air bearings, magnetic bearings or both,
wherein the compressor and the distribution system are arranged so that the compressor and the distribution system are configured to rotate around a vertical axis, and
wherein the aerator rests on a turntable that is configured to rest on the bottom of a reservoir in which the water is located.

17. An aerator for aerating water that comprises a distribution system for distributing air below a water surface and a compressor with an air inlet and at least one air outlet, whereby the compressor is configured to be placed below the water surface in that the compressor is provided with a closed housing configured to prevent an infiltration of the water into the compressor, whereby the infiltration of the water at the air inlet is prevented by an intake pipe being provided of which a first open end is above the water surface and a second open end has a watertight connection to the compressor, whereby the infiltration of the water at the at least one air outlet is prevented by the distribution system having a watertight connection to the at least one air outlet and, due to-the watertight connection of the distribution system or by having at least one valve, the housing is closed to hold back the water and whereby the housing is in thermal contact with the water to cool the compressor, wherein the compressor is a centrifugal compressor that comprises an impeller that is driven by a shaft that is mounted on air bearings,
wherein a portion of pressurized air from the action of the impeller also flows to the air bearings and then to the intake pipe,
wherein at least one the of the air inlet and/or the air outlet of the compressor is positioned under the motor and/or the impeller such that an air bubble will be enclosed in the compressor to hold back the water in the event of a leak when the compressor is placed below the water surface,
wherein the distribution system comprises at least two distribution arms leading away from the compressor, each distribution arm equipped with at least two diffusers, and
wherein at least one distribution arm is provided with a sidelong branch that is equipped with at least one diffuser.

18. An aerator for aerating water that comprises a distribution system for distributing air below a water surface and a compressor with an air inlet and at least one air outlet, whereby the compressor is configured to be placed below the water surface in that the compressor is provided with a housing configured to prevent an infiltration of the water into the compressor, whereby the infiltration of the water at the air inlet is prevented by an intake pipe being provided of which a first open end is above the water surface and a second open end has a watertight connection to the compressor, whereby the infiltration of the water at the at least one air outlet is prevented by the distribution system having a watertight connection to the at least one air outlet and, due to-the watertight connection of the distribution system or by having at least one valve, the housing is closed to hold back the water and whereby the housing is in thermal contact with the water to cool the compressor, wherein the compressor is a centrifugal compressor that comprises an impeller that is driven by a shaft that is mounted on air bearings,
wherein a portion of pressurized air from the action of the impeller also flows to the air bearings and then to the intake pipe,
wherein the compressor and the distribution system are arranged so that the compressor and the distribution system are configured to rotate around a vertical axis, wherein the distribution system is equipped with a nozzle with a direction that has at least a component perpendicular to the radial direction, and wherein the aerator rests on a turntable that is configured to rest on the bottom of a reservoir in which the water is located.

\* \* \* \* \*